United States Patent [19]

Hokusho et al.

[11] Patent Number: 4,541,306
[45] Date of Patent: Sep. 17, 1985

[54] DIFFERENTIAL HAVING REDUCED AXIAL WIDTH

[75] Inventors: Hiroyasu Hokusho, Atsugi; Yohji Ebara, Utsunomiya, both of Japan

[73] Assignee: Nissan Motor Co., Ltd., Japan

[21] Appl. No.: 459,650

[22] Filed: Jan. 20, 1983

[30] Foreign Application Priority Data

Mar. 2, 1982 [JP] Japan .................. 57-31820

[51] Int. Cl.$^4$ .................. F16H 1/40
[52] U.S. Cl. .................. 74/713; 74/710
[58] Field of Search .......... 74/713, 711, 710, 710.5

[56] References Cited

U.S. PATENT DOCUMENTS

| | | | |
|---|---|---|---|
| 1,546,893 | 7/1925 | Haubert | 74/713 |
| 1,641,190 | 9/1927 | Morgan | 74/713 |
| 1,938,457 | 12/1933 | McCaffery | 74/710.5 X |
| 2,397,374 | 3/1946 | Schlicksupp | 74/711 |
| 2,924,125 | 2/1960 | Brandon | 74/713 |
| 3,057,226 | 10/1962 | Blomberg | 74/713 |
| 3,261,230 | 7/1966 | Rudnicki | 74/710.5 |
| 3,499,348 | 3/1970 | Hartupee | 74/710.5 |
| 3,523,467 | 8/1970 | Shachter | 74/711 |
| 4,125,026 | 11/1978 | Torii et al. | 74/713 |

FOREIGN PATENT DOCUMENTS

| | | |
|---|---|---|
| 2115593 | 11/1981 | Fed. Rep. of Germany . |
| 886860 | 10/1943 | France .................. 74/711 |

Primary Examiner—Leslie A. Braun
Assistant Examiner—Dwight G. Diehl
Attorney, Agent, or Firm—Leydig, Voit & Mayer

[57] ABSTRACT

A differential mechanism comprises a pair of side gears each of which has a part-spherical end wall where it is supported on a correspondingly shaped inner wall of a differential casing. Each side gear end wall is adapted to form part of a sphere whose center is located on the axis of the casing and offset from the center of same in such a manner that a differential casing chamber extends less in the axial direction of the casing than in the direction of the axis of rotation of pinion gears.

4 Claims, 2 Drawing Figures

DIFFERENTIAL HAVING REDUCED AXIAL WIDTH

BACKGROUND OF THE INVENTION

1. Field of the Invention

The present invention relates to a vehicle drive system and particularly to its differential mechanism.

2. Description of the Prior Art

FIG. 1 shows a prior art differential mechanism having an outer housing 10 with a casing 12 rotatably supported therein on bearings 14. The casing 12 defines a chamber 16 and has a pair of diametrically opposed openings 18 therein. A pinion shaft 20, retained by a pin 22 in the casing 12 with one end thereof in each opening 18, transverses the chamber 16. A pair of pinion gears 24 are rotatably supported on the pinion shaft 20, one near each end, within the chamber 16. A pair of side gears 26 retained within the chamber 16 engage the pinion gears 24 to form a standard differential gear mechanism. The side gears 26 are axially aligned with the casing 12 and constrained by the differential gear mechanism to rotate in response to the pinion gears 24.

Each pinion gear 24 has a part-spherical end wall 24a and is supported thereat on a correspondingly shaped inner casing wall 12a. Similarly, each side gear 26 has a part-spherical end wall 26a where it is supported on a correspondingly shaped inner casing wall 12b. The inner casing walls 12a and 12b define a common sphere which has a radius of R and whose center coincides with the intersecting point 21 where the axis of rotation of the pinion shaft 20 intersects the axis of rotation of the casing 12 or the axis of rotation of the side gears 26. It follows, therefore, that the pinion gear end walls 24a and the side gear end walls 26a define a common sphere having a radius R.

The above described prior art differential mechanism is disadvantageous since it is bulky in the axial direction of the casing 12. That is, when designing the side gear, an increase in module of the side gear teeth tends to increase the axial size of the differential casing, resulting in an increased overall size of the differential mechanism.

The prior art differential mechanism is further disadvantageous since the side gears are rotatable about the pinion shaft before they are splined to axle shafts, resulting in difficulty when installing the differential mechanism on a car.

SUMMARY OF THE INVENTION

In accordance with the present invention, there is provided a differential mechanism comprising a casing adapted to be rotatably driven and having a chamber, a pair of pinion gears retained within the chamber, and a pair of side gears retained within the chamber and in engagement with the pinion gears to form a differential gear mechanism. Each side gear is formed with a part-spherical end wall and is supported on a correspondingly shaped inner casing wall that defines part of the chamber. In accordance with the present invention, each side gear end wall is adapted to define part of a sphere whose center is located on the axis of the casing and offset from the axis of rotation of the pinion gears so that the casing chamber extends less in the axial direction of the casing than in the direction of the axis of rotation of the pinion gears.

This structure enables the differential mechanism of the present invention to be free from the problems of installing the differential mechanism due to the rotation of the side gears about the pinion shaft.

It is accordingly an object of the present invention to provide a differential mechanism that makes it possible to attain a compact structure while retaining the strength required.

It is a further object of the present invention to provide a differential mechanism of the above described character which is free from the above noted difficulty in installation on a car.

BRIEF DESCRIPTION OF THE DRAWINGS

The features and advantages of the differential mechanism according to the present invention will become more clearly appreciated from the following description taken in conjunction with accompanying drawings, in which.

DESCRIPTION OF THE PREFERRED EMBODIMENT

Figure 1:
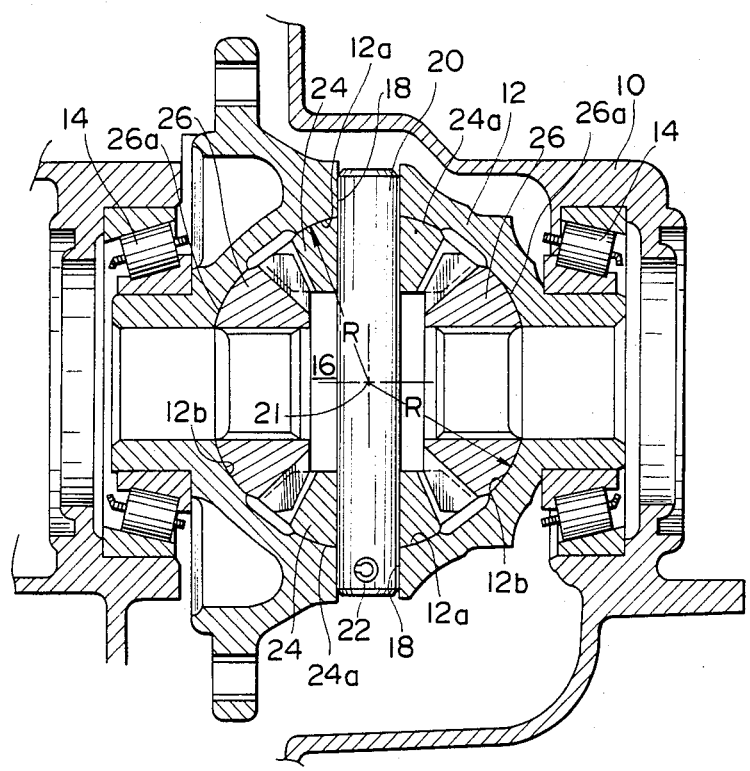
FIG. 1 is a sectional view of a prior art differential mechaism.
Figure 2:
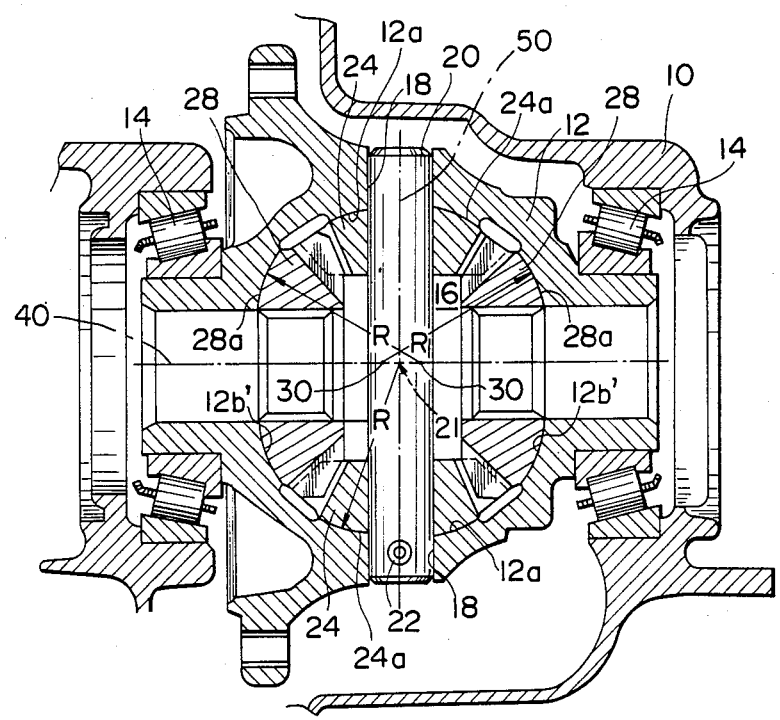
FIG. 2 is a sectional view of a differential mechanism embodying the present invention.

Referring to FIG. 2, in which parts and portions that are substantially similar to those of the prior art mechanism of FIG. 1 are indicated by like reference characters, the differential mechanism of the present invention comprises a pair of side gears 28, each of which has a part-spherical end wall 28a supported on a correspondingly shaped casing inner wall 12b' which defines a part spherical region providing a recess. Each side gear end wall 28a and supporting region is constructed and arranged to define part of a sphere whose center 30 is located on the axis of rotation 40 of the casing 12 and offset from the axis of rotation 50 of the pinion gears in such a manner that the chamber 16 extends less in the axial direction of the casing 12 than in the direction of the axis of rotation 50 of the pinion gears.

More specifically, each side gear end wall 28a is adapted to define part of a sphere which has a radius of R and whose center 30 is located on the axis of rotation 40 of the side gears and spaced apart from the intersecting point 21 of axes 40 and 50 toward the other side gear end wall, providing a chamber 16 that is shorter in the axial direction of the casing 12 than in the axial direction of the pinion shaft 20. Each inner casing wall that supports a side gear 12b' is adapted to define part of a sphere which has a radius of R and whose center 30 is located on the axis 40 of the casing 12 and offset from the intersecting point 21 toward the other side gear causing the chamber 16 to be shorter in the axial direction of the casing 12 than in the axial direction of the pinion shaft 20.

With the foregoing structure, the side gears 28 can be axially smaller and therefore the chamber 16 can be smaller in the axial direction of the casing 12, making it possible to attain a compact differential mechanism while retaining the strength required.

Furthermore, since the center of the sphere partly defined by the end walls 28a is offset from the intersecting point 21, the side gears 28 cannot rotate about the pinion shaft 20. Thus, the part-spherical regions of the casing chamber defined by the end walls 12b' provide means for retaining the side gears from rotating within the chamber 16 about the axis of the pinion shaft 20.

From the foregoing, it is to be understood that according to the present invention the center of the sphere partly defined by each side gear end wall or the matching chamber region 12b is offset from the center of the casing or the casing chamber so that the casing chamber may be reduced in size in the axial direction of the casing, enabling the differential mechanism to be made more compact in the direction of the axis of rotation 40 of the casing. Accordingly, it is made possible to reduce the slant angle of a drive shaft and therefore the angle that the drive shaft forms with a drive pinion.

Obviously, numerous modifications and variations of the present invention are possible in light of the above teachings. It is therefore to be understood that within the scope of the appended claims, the invention may be practiced otherwise than as specifically described herein.

What is claimed is:

1. A differential mechanism comprising:
    a casing adapted to be rotatably driven about an axis of rotation and having a chamber defined by walls;
    a pair of pinion gears retained within said chamber rotatable about an axis of rotation normal to and having an intersecting point with said axis of rotation of said casing;
    a pair of side gears retained within said chamber and engaging said pinion gears to form a differential gear mechanism;
    each of said side gears having a part-spherical end wall;
    means for retaining said side gears from rotating within said chamber about the axis of rotation of said pinion gears including a pair of part-spherical regions defined in said chamber, each said region being defined by a wall of said chamber having a spherical shape substantially complementary to the end wall of one of said side gears and each said region providing a recess in said chamber for supporting one of said side gears;
    each of said side gear receiving part-spherical regions comprising part of a sphere having a center located on said axis of rotation of said casing and offset from said intersecting point in a direction providing a chamber extending lens in the axial direction of said casing than in the direction of the axis of rotation of said pinion gears.

2. A differential mechanism as set forth in claim 1 in which each of said pinion gears has a part-spherical end wall supported on a correspondingly shaped inner casing wall, said inner casing wall defining part of said chamber, said pinion gear end walls defining parts of a sphere whose center coincides with said intersecting point.

3. A differential mechanism as set forth in claim 2 in which the radius of the sphere partly defined by said side gear end walls is equal to that of the sphere partly defined by said pinion gear end walls, and in which the center of said each sphere partly defined by said side gear end walls is offset from the center of said casing toward the other side gear end wall.

4. A differential gear mechanism as set forth in claim 3 in which said pinion gears are rotatably supported on a pinion shaft retained in said casing, and in which said axis of rotation of said casing coincides with the axis of rotation of said side gears.

* * * * *